Figures 1, 2:
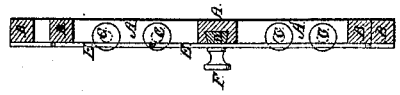

W. S. Nelson.
Ship Implement.

No. 44,738. Patented Oct. 18, 1864.

Witnesses,
Henry Moore
Geo. W. Reed

Inventor:
W. S. Nelson
per Munn & Co.
Attorneys

UNITED STATES PATENT OFFICE.

WILLIAM S. NELSON, OF ST. LOUIS, MISSOURI.

IMPROVED ADJUSTABLE TEMPLET.

Specification forming part of Letters Patent No. 44,738, dated October 18, 1864.

*To all whom it may concern:*

Be it known that I, WILLIAM S. NELSON, of the city of St. Louis, in the county of St. Louis and State of Missouri, have invented a new and improved adjustable templet for marking the positions of the holes in the plates of laminated war-turrets and other similar structures before they are set up in place; and I do hereby declare that the following is a full, clear, and exact description thereof, which will enable others skilled in the art to make and use the same, reference being had to the accompanying drawings, forming a part of this specification, in which—

Figure 1 is a plan of the templet. Fig. 2 is a transverse section of the same.

Similar letters of reference indicate corresponding parts.

The object of this invention is to enable the positions of the holes in the several series or courses of plates in a laminated war-turret, in the laminated armor of vessels, or in other laminated structures to be marked and the holes to be drilled or punched in each plate separately in a drilling or punching machine, instead of requiring the plates to be drilled through several courses after they have been set up together or of requiring the plates to be carried first to the turret or vessel, thence to the drilling or punching machine, and thence back to the turret or vessel, thereby saving much labor; and to this end it consists in a templet composed of a perforated frame with adjustable sides and ends and independently-adjustable arms, substantially as hereinafter described.

This templet may be made of wood or metal, but I prefer to make it of wood, on account of its greater lightness, which will enable it to be easily carried back and forth between the turret or vessel and the place where the holes are to be marked, punched, and drilled.

A is a straight central bar, having a T-head, A', at each end. B B B B are four straight flat side bars, arranged two on each side of the central bar, A, the two outer ones being of a length corresponding with that of the central bar and the two inner ones somewhat shorter. These bars have straight dovetail-shaped arms *b b* projecting inwardly from their ends at right angles to the length of the bars, to be received in dovetail grooves *a a*, provided in the T-shaped heads of the central bar, and set-screws C C are applied on the inner sides of the T-shaped heads, to secure the said arms in place, and so hold the side bars at the requisite distances from the central bar. The central bar has on one side a longitudinal dovetail groove in one face, extending the whole length for the reception of a dovetail slide, D, which is fitted to move longitudinally therein. E E are flat straight sides, having straight slots *e e* extending nearly the whole length, and circular holes *d d* near both ends. F F are screws inserted through the slots of the said slides and screwing into tapped holes *f f* in the slide D, for the purpose of securing the said slides firmly to the central bar, A, the said screws serving also to secure the said slide firmly to the center-bar, A. G G are holes drilled through the T-heads A' A' and side bars, B B, corresponding in distance apart with the holes to be drilled in a turret-plate.

To use the templet in building a turret, I first mark off the holes in the several plates of the first or inside course, and after drilling or punching them I set up that course in its place and take the templet and set it up against one of the plates of that course and adjust the side bars, B B, and secure them by means of the set-screws C C in such positions that the holes G G in the said bars cover those of the plate. I then carry the templet to the place where are the bent plates of the second course and place it upon one after another of the said plates, and with a suitable instrument mark off upon the said plates through the holes G G the positions of the holes to be drilled or punched in the said plates, and after drilling or punching the said holes set up the second course of plates outside of the first course and bolt them to the latter by two or more bolts in each to keep them in place, after which I take the templet and place it against the last plate of the second course and readjust the bars B B to make the holes G G cover all the holes in that plate. I next take the templet to the plates of the third course and mark off through the holes G G the positions of the holes in those plates, and proceed as before with every course in succession until the several courses are set up. The opposite holes in the several courses are then reamed out.

For marking the holes for the armor of vessels the bars B B are detached from the T-shaped heads A' A', and the center bar, with the attached slotted sides E E, used as follows: The templet is first placed upon or against the side or other part of the vessel where the armor is to be attached, and in which the bolt-holes have been bored, over the part which is to receive a plate, and the slide D and slotted slides E—of which there must be one for every hole—severally adjusted and secured in such positions that every bolt-hole is covered by one of the holes $d$. The templet is then carried to the plate and the positions of the holes in the plate marked through the holes $d\ d$. The holes in the plate are then punched or drilled, and the plate, which is then taken to the vessel, bolted on by a sufficient number of bolts to hold it. The same process is performed for every plate of the first course, and after all have been put on the templet is taken to the first plate of that course and the slides adjusted to bring their holes $d\ d$ over the holes of the said plates and afterward taken to the first plate of the second course, which is marked in the same way, and so on to every plate of the first course, thence to every one of the second, and thence to those of the third, and from each to the succeeding course.

What I claim as my invention, and desire to secure by Letters Patent, is—

1. The adjustable perforated side bars, B B, in combination with the T-shaped heads A′ A′ of the central bar, A, substantially as and for the purpose herein specified.

2. The adjustable slotted and perforated slides E E and central slide, D, in combination with each other and the central bar, A, substantially as and for the purpose herein set forth.

WM. S. NELSON.

Witnesses:
  H. W. LEFFINGWELL,
  W. B. SWAN.